June 6, 1933.  F. W. LEUTHESSER  1,913,165
AIR RELIEF VALVE
Filed July 18, 1929
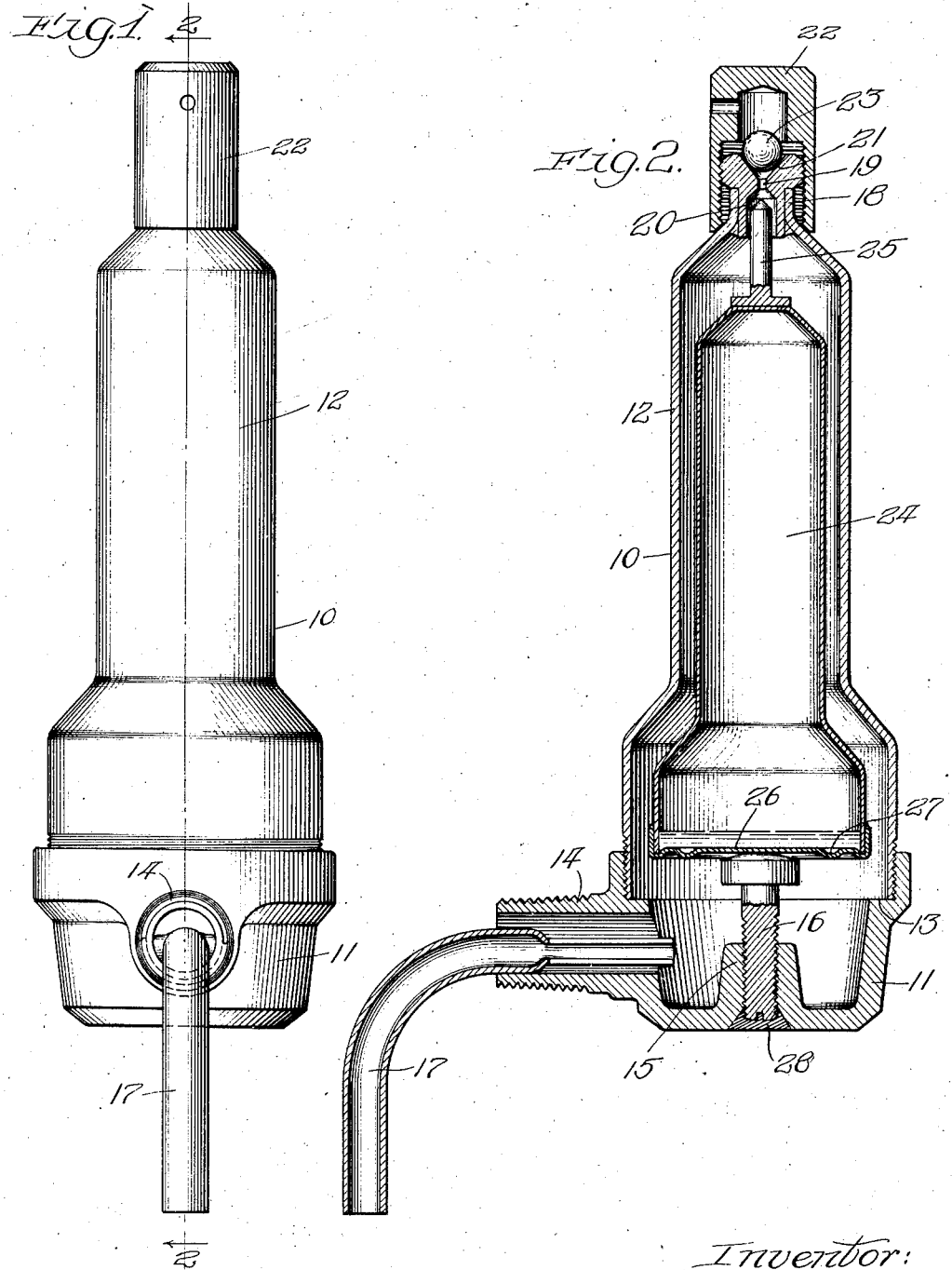
Inventor:
Fred W. Leuthesser,
By Banning & Banning
Attys.

Patented June 6, 1933

1,913,165

UNITED STATES PATENT OFFICE

FRED W. LEUTHESSER, OF OAK PARK, ILLINOIS

AIR RELIEF VALVE

Application filed July 18, 1929. Serial No. 379,083.

This invention relates to air relief valves and particularly to valves for permitting the removal of air from steam radiators and other steam containers.

One of the objects of the invention is to provide a non-adjustable valve having means for the adjustment of the valve during assembly which is remote from the valve seat and can be operated from the exterior of the valve casing and thereafter permanently obscured.

A further object of the invention is to provide an air vent valve having a double valve seat, a valve member adapted to prevent return of air into the valve and a thermostatic float valve adapted to prevent the escape of steam or water while permitting escape of air, from the valve, said float valve being provided with means of adjustment remote from said double valve seat.

Other objects, advantages and capabilities will later more fully appear.

My invention further resides in the combination, construction and arrangement of parts illustrated in the accompanying drawing, and while I have shown herein a preferred embodiment I wish the same to be understood as illustrative only and not limiting the scope of my invention.

In the accompanying drawing,

Figure 1 is an elevational view of an air relief valve embodying my invention, and Fig. 2 is a section on the line 2—2 of Fig. 1.

Referring to the drawing, the valve comprises a casing or valve chamber 10, which preferably comprises a base 11, and an upper tubular portion 12. The base 11 is provided with an interior shoulder 13 and thereabove is interiorly threaded to receive an exteriorly threaded portion at the bottom of the tubular portion 12. The base 11 is provided with a threaded nipple 14 which is preferably formed integrally therewith, said nipple 14 being adapted to screw into a tapped opening of a radiator coil or other steam container.

The bottom of the base 11 is provided with an upstanding boss 15 which is bored and tapped to receive a threaded pin 16 which is provided with a slot at its lower end so that it may be rotated from the exterior of the chamber 10 during assembly. Through the nipple 14 extends a siphon tube 17 which is suitably slit and flared laterally at its inner end to retain same in position.

The lower end of the tubular portion 12 of the chamber 10, is preferably of relatively large diameter, and gives into a relatively long cylindrical portion of smaller diameter, the upper end of which tapers into a neck portion 18 which is provided with a double valve seat connected by an air passage 19. The lower valve seat is designated 20 and the upper valve seat 21. The neck portion 18 is threaded to receive a vented cap 22 which serves to surround a ball 23 and retain same in operative relation to the valve seat 21.

Within the tubular portion 12 of the chamber 10, is located a thermostatic float 24, which is similar in shape to said tubular portion but substantially smaller in size so as to move freely therethrough. At its upper end the float 24 is provided with a valve needle 25 the upper end of which is tapered to engage the valve seat 20. The lower end of the float 24 is closed by a diaphragm 26 of light metal which is preferably provided with one or more circular corrugations 27 to accentuate the distortion thereof when pressure is produced within the float. Before the float is sealed a suitable amount of volatile liquid is introduced thereinto so that the diaphragm 26 is pressed downwardly when steam enters into the chamber 10.

In assembling the valve, the float 24 is introduced into the tubular portion 12 which is then forcibly screwed into the base 11. This union may be rendered more permanent by soldering or brazing, if desired. The threaded pin 16 is then adjusted properly to position the float 24. This adjustment may be effected by rotating the pin by means of its slot from below until the valve needle becomes firmly seated on the seat 20 and then retracting the pin to a limited extent depending upon the distortion of the diaphragm 26 upon exposure of the float to steam. Or the nipple 14 may be connected to a source of steam and the pin 16 actuated until escape of steam by the passage 19 is prevented. After the adjustment of the pin 16, the lower end of the bore of the boss 15 is closed by supplying solder or other fused metal 28 thereto, thus preventing further movement or unnecessary manipulation of the pin 16.

In operation, the valve will permit air to pass from a steam radiator or other steam system, the needle 25 being in retracted position and the pressure being sufficient to raise the ball 23 off the seat 21. If the chamber 10 becomes flooded with water the float 24 is raised thereby so that the needle 25 closes the passage 19 and prevents its escape. When the air is displaced and steam enters the chamber 10, the volatile liquid in the float 24 is vaporized and the diaphragm 26 is distorted outwardly and owing to its engagement with the upper end of the pin 16, the needle 25 is pressed upwardly against the seat 20 and prevents escape of the steam. When the pressure within the steam system falls below atmospheric pressure the ball 23 will prevent the return of air to a substantial extent and enable the system to operate under vacuum thus increasing its heat transfer efficiency and its continuity of operation.

I claim:

1. An air relief valve comprising a chamber formed from two parts, the lower part being of cup shape and the upper part of substantially tubular shape and contracting to a neck at its upper end, an air passage through said neck, a ball seated thereon, a vented cover retaining said ball in operative relation to said seat, a valve seat in the inner end of said neck, a threaded nipple extending laterally from said lower part, an upstanding boss on the bottom of said lower part, said boss being bored and tapped, a threaded pin in said bore provided with a slot at its lower end whereby it may be rotated and advanced in said bore, the lower end of said pin being located in said bore, a float in said chamber provided with a valve needle at its upper end adapted to engage the inner valve seat and at its lower end with a distortable diaphragm, volatile liquid in said float adapted to become vaporized by steam to distort said diaphragm, said diaphragm being engaged by the upper end of said pin to maintain the valve needle in operative relation to the inner valve seat, and a mass of solder in the lower end of said bore maintaining said pin in adjusted position.

2. An air relief valve comprising an elongated chamber having a flat base and an internal boss in the base, a valve seat at the upper end of the chamber, a thermostatic float valve having a corrugated diaphragm adapted to cooperate with said seat, a headed pin mounted in the internal boss contacting the diaphragm and operable from the exterior of the chamber for adjusting the float valve, the lower end of the pin being above the bottom face of the base and surrounded thereby, whereby fusible material may be filled in flush with said face to secure the pin in adjusted position.

3. An air relief valve comprising an elongated chamber, a valve seat at the upper end of the chamber, a thermostatic float valve adapted to cooperate with the valve seat, a boss having a threaded bore extending inwardly from the flat base, a headed pin threaded in the bore of the boss and contacting with the float valve to adjust same with respect to its seat, the lower end of the pin terminating above the face of the base, and fusible metal in the lower end of said bore and flush with the base maintaining the pin permanently in adjustment and preventing leakage through the bore.

4. An air relief valve, comprising a cylindrical casing contracted at its upper end and having a centrally disposed valve seat, a cupped base closing the lower end of said casing, said base having a centrally apertured reentrant bottom portion, a hollow valve carrying float movable in said casing relative to the valve seat and charged with a heat-expansible fluid, a flexible diaphragm forming the bottom wall of said float, and an adjusting screw threaded in the aperture in the reentrant base and formed at its inner end with a rounded head engaging the under surface of said diaphragm, the outer end of said adjusting screw being surrounded by the walls of the reentrant bottom portion.

5. An air relief valve, comprising a cylindrical casing contracted at its upper end and having a centrally disposed valve seat, a cupped base closing the lower end of said casing, said base having a centrally apertured reentrant bottom portion, an adjustable support threaded into the aperture of said bottom portion, a hollow valve carrying float movable in said casing relative to the valve seat and charged with a heat expansible fluid, a flexible diaphragm cooperating with said support and forming the bottom wall of said float, and a siphon tube extending outward through said base and having means extending laterally within the base to prevent displacement thereof.

6. An automatic valve of the class described, comprising a casing, a hollow float movable in said casing and charged with a heat expansible fluid, a flexible diaphragm forming the bottom wall of the said float, a valve seat adapted to be closed by the outward flexure of said diaphragm, an adjusting screw projecting through the bottom of the casing and having a rounded head engaging the under surface of said diaphragm to support said diaphragm in spaced relation to said bottom and provide a drain chamber therebeneath, and a siphon tube extending laterally outward through said casing from the drain chamber below said diaphragm.

In testimony whereof, I have hereunto set my hand this 15th day of July, 1929.

FRED W. LEUTHESSER.